(12) United States Patent
Liao et al.

(10) Patent No.: US 12,159,621 B2
(45) Date of Patent: Dec. 3, 2024

(54) APPLICATION SOFTWARE AND SERVICES WITH REGISTER CLASSIFICATION CAPABILITIES

(71) Applicant: Microsoft Technology Licensing, LLC, Redmond, WA (US)

(72) Inventors: Huakai Liao, Redmond, WA (US); Ana Parra, San Jose, CA (US); Gaurav Vinayak Tendolkar, San Jose, CA (US); Amit Srivastava, San Jose, CA (US); Siliang Kang, Redwood City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 255 days.

(21) Appl. No.: 17/834,355

(22) Filed: Jun. 7, 2022

(65) Prior Publication Data

US 2023/0395064 A1    Dec. 7, 2023

(51) Int. Cl.
*G10L 15/04*    (2013.01)
*G10L 15/02*    (2006.01)
*G10L 15/08*    (2006.01)

(52) U.S. Cl.
CPC .............. *G10L 15/02* (2013.01); *G10L 15/04* (2013.01); *G10L 15/08* (2013.01)

(58) Field of Classification Search
CPC ......... G10L 15/02; G10L 15/04; G10L 15/08; G10L 25/51; G09B 19/04
See application file for complete search history.

(56) References Cited

U.S. PATENT DOCUMENTS

| 10,269,375 | B2 * | 4/2019 | Arsikere | G10L 25/21 |
| 2012/0136823 | A1 * | 5/2012 | Konuma | G06Q 10/10 |
| | | | | 706/54 |
| 2014/0278391 | A1 * | 9/2014 | Braho | G10L 25/78 |
| | | | | 704/233 |
| 2020/0015083 | A1 * | 1/2020 | Xie | H04W 52/367 |
| 2020/0265864 | A1 * | 8/2020 | Markovic | G10L 25/18 |
| 2021/0358476 | A1 | 11/2021 | Leone et al. | |

OTHER PUBLICATIONS

Patel, et al., "Vocal and Neural Responses to Unexpected Changes in Voice Pitch Auditory Feedback During Register Transitions", In Journal of Voice, vol. 30, Issue 6, Nov. 1, 2016, 8 Pages.
"International Search Report and Written Opinion Issued in PCT Application No. PCT/US23/019531", Mailed Date: Jul. 5, 2023, 11 Pages.

(Continued)

*Primary Examiner* — Huyen X Vo

(57) ABSTRACT

A computing apparatus comprises one or more computer readable storage media, one or more processors operatively coupled with the one or more computer readable storage media, and program instructions stored on the one or more computer readable storage media. The program instructions, when executed by the one or more processors, direct the computing apparatus to at least generate an audio recording of speech, extract features from the audio recording indicative of vocal patterns in the speech, determine a register classification of the speech based at least on the features, and display an indication of the register classification in a user interface.

20 Claims, 9 Drawing Sheets

(56) References Cited

OTHER PUBLICATIONS

"What is Vocal Fry & is It Bad for You?", Retrieved From : https://www.youtube.com/watch?v=s_LmC-ynqGM, Aug. 3, 2015, 21 Pages.
Degottex, Gilles, "Covarep : A Cooperative Voice Analysis Repository for Speech Technologies", Retrieved From : https://github.com/covarep/covarep, Feb. 26, 2019, 3 Pages.
Anderson, et al., "Vocal Fry May Undermine the Success of Young Women in the Labor Market", In Journal of Plos One, vol. 9, Issue 5, May 28, 2014, 8 Pages.
Degottex, et al., "COVAREP—A Collaborative Voice Analysis Repository for Speech Technologies", In Proceedings of IEEE International Conference on Acoustics, Speech and Signal Processing (ICASSP), May 4, 2014, 5 Pages.
Drugman, et al., "Resonator-Based Creaky Voice Detection", In Proceedings of Thirteenth Annual Conference of the International Speech Communication Association, Sep. 9, 2012, 4 Pages.

\* cited by examiner

FIGURE 8

APPLICATION SOFTWARE AND SERVICES WITH REGISTER CLASSIFICATION CAPABILITIES

TECHNICAL FIELD

Aspects of the disclosure are related to the field of computer software applications and, in particular, to technology for providing register classifications of speech.

BACKGROUND

A vocal register describes the range of tones produced by the human voice in terms of one or more vocal patterns such as pitch. The human voice is considered capable of producing vibratory patterns that fall into several distinct ranges including a normal (or modal) range, a middle range, and an upper range. Some models also acknowledge a very high range (whistle) and a very low range (vocal fry). Sounds in the vocal fry range are produced by very low frequency vibrations to obtain pitches that are not available in the modal range.

Exercising the lowest part of the vocal register can have therapeutic benefits for singers and, in fact, is common in some styles of music and other artistic contexts. However, in the context of public speaking or other professional settings, speech in the lower or lowest ranges of the vocal register is perceived less positively—and even negatively in some circumstances. Recent advances in software applications include features capable of providing users with feedback as they rehearse presentations. Unfortunately, such capabilities do not include providing feedback on the range(s) of the vocal register used by the speaker.

Overview

Technology is disclosed herein that allows a user to obtain feedback on characteristics of their speech, including a range of their vocal register. Such a capability may be integrated into the features and functionality of software applications and/or services such as presentation applications and services, collaboration applications and services, and the like.

In an implementation, a computing apparatus comprises one or more computer readable storage media, one or more processors operatively coupled with the one or more computer readable storage media, and program instructions stored on the one or more computer readable storage media. The program instructions, when executed by the one or more processors, direct the computing apparatus to at least generate an audio recording of speech, extract features from the audio recording indicative of vocal patterns in the speech, determine a register classification of the speech based at least on the features, and display an indication of the register classification in a user interface.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 8 illustrates another user interface in an implementation.

DETAILED DESCRIPTION

Various implementations are disclosed herein that improve upon computer generated feedback in user interfaces to software applications capable of analyzing and alerting users based on register classifications of their speech. Such capabilities may be implemented in local resources (e.g., local applications and devices), remote resources (servers and cloud services), or distributed amongst both local and remote resources.

In a brief example, a user prepares for a meeting by rehearsing a presentation with a "coaching" feature of an application capable of analyzing the user's speech. The software coach evaluates the user's pacing, pitch, vocal patterns, use of filler words (e.g., um, like, etc.), informal speech, euphemisms, culturally sensitive terms, and the like. Subsequent to its evaluation, the software coach generates a report that includes statistics and suggestions for improvement.

During the rehearsal, the user speaks into a microphone or other appropriate receiver, and the software coach creates an audio recording of the user's speech. The software coach then extracts vocal patterns (e.g., phonetics, etc.) from the audio recording and employ machine learning (ML) techniques to determine a register classification of the user's speech. The register classification may include a range (e.g., normal, high, low, etc.), a distinct value (e.g., harmonic ratio), and the like. Under some circumstances, the software coach surfaces the register classification in a user interface, such as when the classification indicates vocal fry.

In some implementations, the audio recording is divided into chunks of speech, and the chunks are further divided into frames of speech comprising audio signals. Vocal patterns are identified for each frame and extracted from the audio signals for further analysis. Each frame is then classified based on its respective vocal patterns. The frame classifications are then associated back to their respective chunks and aggregated for further analysis. In other words, frames of an individual chunk have their classifications aggregated and analyzed together.

Chunks are then classified based on an aggregate of their frame classifications. Next, the classifications of the chunks are aggregated and analyzed to generate a classification for the speech overall, which is used to generate feedback. A user interface may then be displayed with the feedback about the user's speech.

Figure 1:
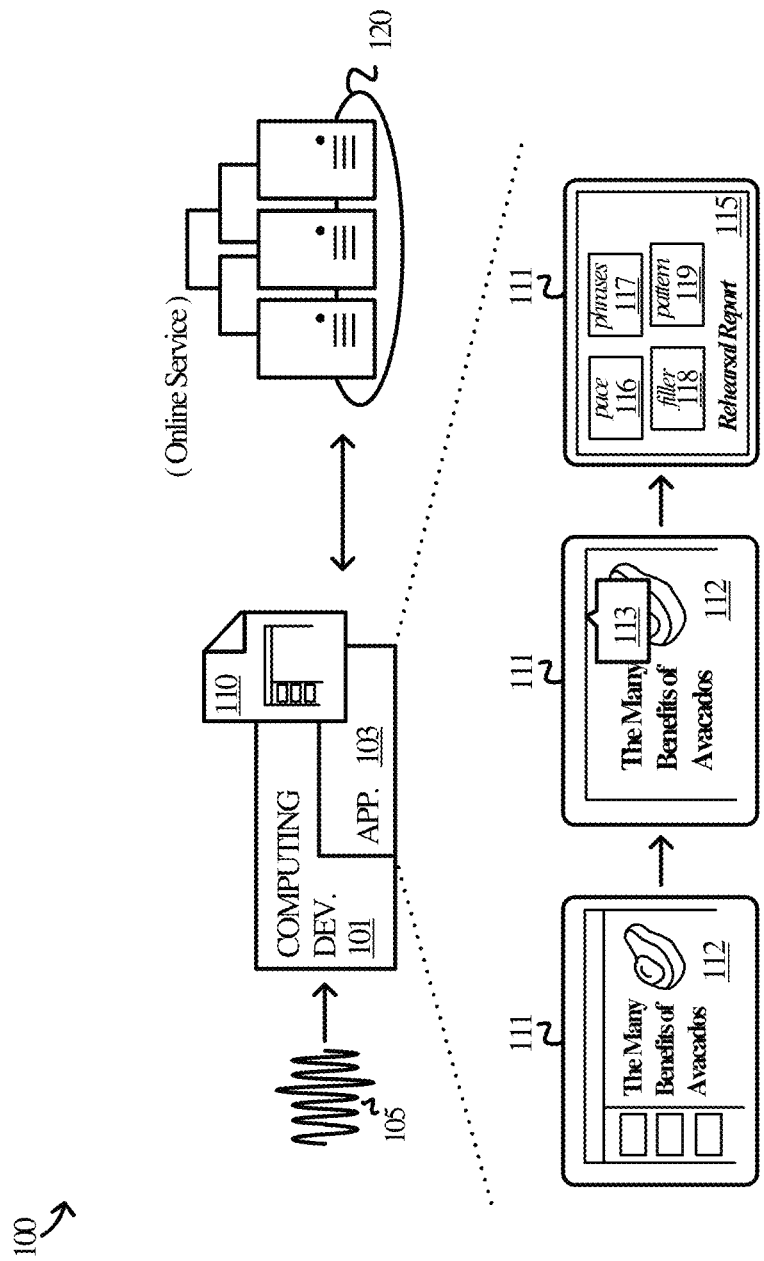
FIG. 1 illustrates an operational environment in an implementation.
Figure 9:
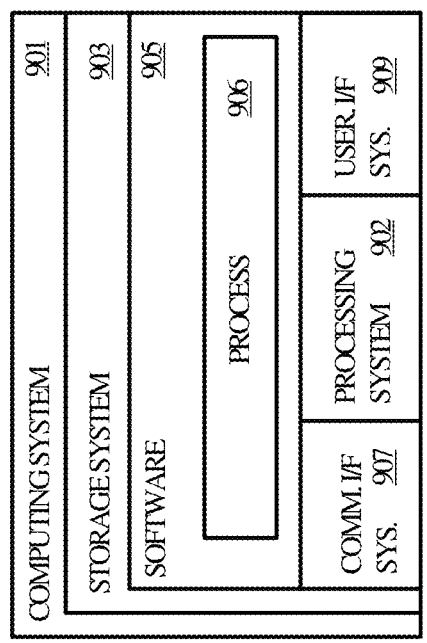
FIG. 9 illustrates a computing system suitable for implementing the various operational environments, architectures, processes, scenarios, and sequences discussed below with respect to the other Figures.

Turning to the figures, FIG. 1 illustrates an operational environment 100 in an implementation. Operational environment 100 includes computing device 101, audio input 105, and online service 120. Computing device 101 includes one or more software applications, of which application 103 is representative, capable of providing a user experience with respect to a presentation document (herein referred to as document 110). The user experience provided by computing device 101 includes user interface 111. Examples of computing device 101 include personal computers, tablet computers, mobile phones, and any other devices suitable for executing application 103, of which computing device 901 in FIG. 9 is broadly representative.

Application 103 is representative of any software application in which a user can open and interact with a presentation document, examples of which may include a word processing document, a slide presentation, a workbook, a digital notebook, an electronic communication, a collaboration file, a web document, or any other type of file. Examples of application 103 include—but are not limited to—productivity applications, presentation applications, word processing applications, digital notebook applications, conferencing applications, gaming applications, and the like. Application 103 may be a natively installed and executed application, a browser-based application, a mobile application, or any other application suitable for experiencing spreadsheets, tables, and the like. Application 103 may execute in a stand-alone manner (as in the case of a natively installed application) or within the context of another application (as in the case of a browser-based application), or in some other manner.

Online service 120, which is optional, provides one or more computing services to end points such as computing device 101. For example, online service 120 may host all or portions of document 110, and all or portions of a presentation application or service. Accordingly, it may be appreciated that some of the features and functionality attributed to application 103 on computing device 101 may be performed by online service 120 in some implementations. Online service 120 may provide a variety of other services including file storage, co-authoring and collaboration support, and the like. In some examples, online service 120 may provide a suite of applications and services with respect to a variety of computing workloads such as office productivity tasks, email, chat, voice, video, audio editing, and so on. Online service 120 employs one or more server computers co-located or distributed across one or more data centers connected to computing device 101. Examples of such servers include web servers, application servers, virtual or physical (bare metal) servers, or any combination or variation thereof, of which computing device 901 in FIG. 9 is broadly representative. Computing device 101 may communicate with online service 120 via one or more internets and intranets, the Internet, wired and wireless networks, local area networks (LANs), wide area networks (WANs), and any other type of network or combination thereof.

Figure 2:
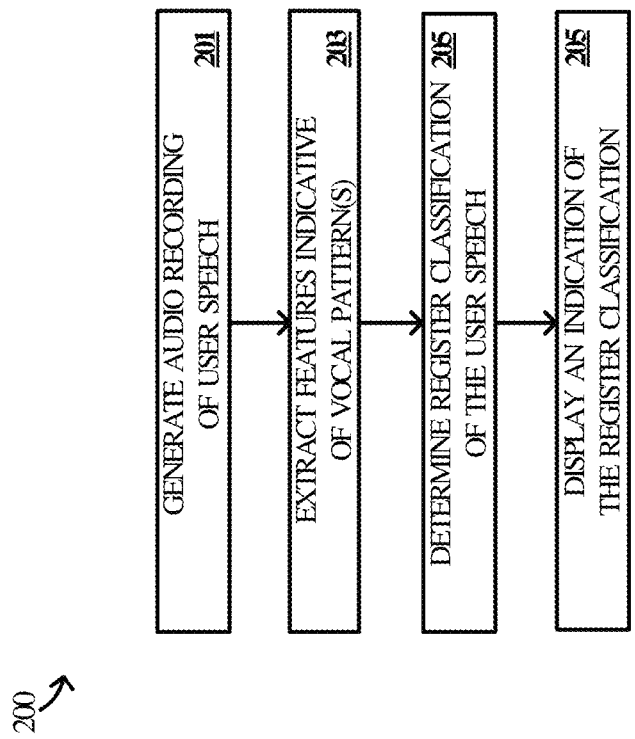
FIG. 2 illustrates a register classification process in an implementation.

Computing device 101 and/or online service 120 may employ a classification process, of which classification process 200 in FIG. 2 is representative, to determine a register classification of audio input 105. Referring to FIG. 2, register classification process 200 may be implemented in program instructions in the context of any of the software applications, modules, components, or other such elements of one or more computing devices. The program instructions direct the computing device(s) to operate as follows, referred to parenthetically to the steps of FIG. 2 and in the singular for the sake of clarity.

In operation, a computing device receives an audio input comprising user speech (e.g., words spoken aloud) and generates an audio recording of the user speech (step 201). This may occur when—for example—a user recites a script into a microphone of the computing device. The audio recording comprises digital audio signals having features indicative of vocal patterns. The computing device extracts the features (step 203) for further analysis. For example, the computing device may employ signal processing techniques (e.g., linear predictive coding) to extract one or more features indicative of vocal patterns from the audio recording.

Based on the extracted features, the computing device determines a register classification of the user speech (step 205). The computing device may determine the register classification at least by analyzing a harmonic of the extracted features to determine whether a magnitude of the power spectrum of the user speech (e.g., at the second harmonic) is significantly greater (e.g., based on a threshold value) than the magnitude of the fundamental frequency and/or pitch frequency.

Machine learning (ML) techniques may be employed (e.g., by the computing device) to obtain the threshold value. For example, a ML environment may be trained to identify the threshold value by ingesting a training set of audio recordings and receiving feedback on its analysis of the training set. Alternatively, the machine ML environment may employ an unsupervised model to identify patterns, clusters, etc. in audio recordings to determine the threshold value.

Subsequent to determining the register classification, the computing device displays an indication of the register classification (step 207). The indication of the register classification may be displayed as a user interface element (e.g., a pop-up notification), as a report, a visual alert, an audible alert, and the like.

Referring back to FIG. 1, the following describes a user experience with respect to operational environment 100 in the context of register characterization process 200 as employed by application 103 and/or online service 120.

In operation, a user engaged with application 103 opens a presentation document in an edit mode, which causes the display of slide 112 in user interface 111. User interface 111 includes slide 112 and rehearsal report 115. Slide 112 is initially shown in an editing mode, and at a later time, slide 112 is displayed in a presentation mode. When document 110 or slide 112 is in an editing mode, user interface 111 may display thumbnail representations of additional slides, areas for adding notes, an editable version of slide 112, and other application chrome. Slide 112 may include a canvas upon which a user may place content such as text, images, action icons, videos, and the like. When document 110 or slide 112 is in a presentation mode, user interface 111 may display a non-editable version of slide 112, which may include presentation graphics (e.g., slide text, images, video, audio, etc.) and other features intended for display to an audience. In some instances, presentation mode may allow a presenter to see note text and/or graphics, action icons, playback controls, etc. while keeping these features hidden from the audience.

While in the presentation mode, application 103 receives audio input 105 comprising user speech spoken by the user. Application 103 captures an audio recording of the user speech proceeds to analyze it for purposes of register classification. Alternatively, application 103 could upload the audio to online service 120 to allow online service 120 to provide the classification.

Application 103 proceeds to identify register characteristics of audio input 105 by extracting one or more features indicative of vocal pattern from the audio recording. As previously mentioned, signal processing techniques may be employed to extract one or more features from the audio recording. Next, application 103 determines a register classification for the speech based at least in part on the extracted features. Such a determination may be made by, for example, comparing the extracted features to known features for known vocal ranges. Other factors may include a duration of the audio, a duration of one or more portions of the audio having a particular classification, and other factors. In one example, application 103 determines the register classification by analyzing harmonics of the extracted features to determine whether a magnitude of the power spectrum of the user speech (e.g., at the second harmonic) is significantly greater (e.g., based on a threshold value) than the magnitude of the fundamental frequency and/or pitch frequency. The register characterization process may employ ML techniques to obtain the threshold value.

It is assumed here for exemplary purposes that the identified classification is one that triggers the display of indication 113 in user interface 111. Examples of indication 113 include, for example, a pop-up graphic, an overlay, a message bubble, an audible (non-visual) signal, or any other suitable indication. Indication 113 gives a hint to users that they are using a portion of their vocal register that falls into a range that may be undesirable. Once done rehearsing, the user can transition application 103 out of presentation mode and to a display of rehearsal report 115 in user interface 111. Rehearsal report 115 includes, for example, various elements 116-119 for coaching users on their speaking style. For example, rehearsal report 115 includes element 116 related to speaking pace, element 117 related to sensitive phrases, element 118 related to filler words, and element 119 related to vocal patterns. Each element may include detailed information about the user's performance with respect to each category, allowing users to improve the content of their presentation and their spoken delivery of the same.

Figure 3:
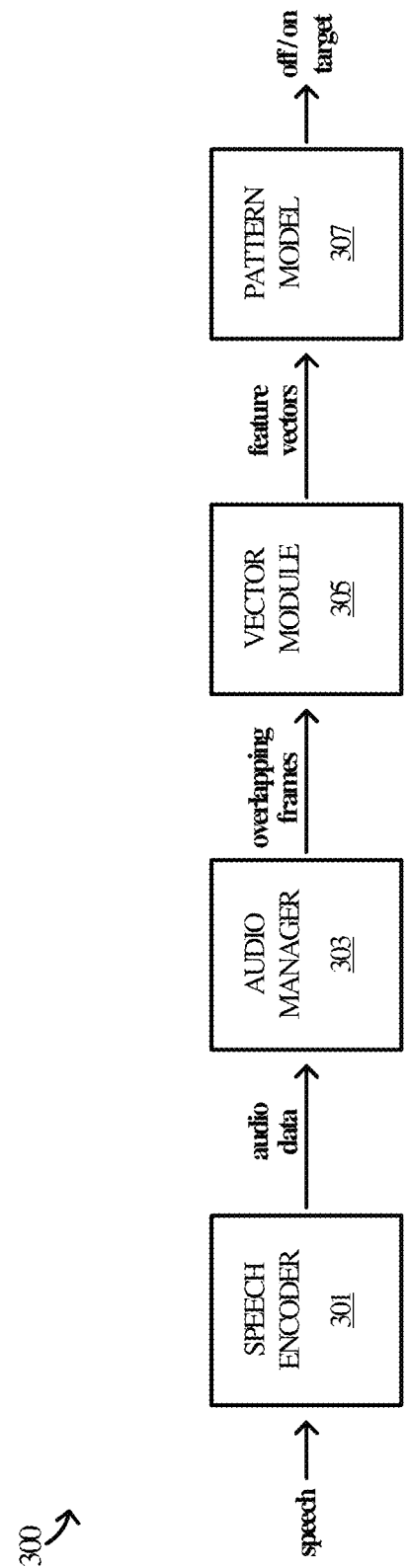
FIG. 3 illustrates an operational architecture in an implementation.

FIG. 3 illustrates service architecture 300 in an implementation. Service architecture 300 is representative of an architecture for providing the register classification capabilities disclosed herein. Architecture 300 may be employed by computing device 101, online service 120, or distributed between both computing device 101 and online service 120.

Architecture 300 includes speech encoder 301, audio manager 303, vector module 305, and pattern model 307. Speech encoder 301 is representative of any component(s) capable of receiving speech and producing audio data. Audio manager 303 is representative of any component(s) capable of receiving audio data and producing overlapping frames. Vector module 305 is representative of any component(s) capable of receiving overlapping frames and analyzing them to produce a feature vector(s). Pattern model 307 is representative of a machine learning model capable of receiving a feature vector(s) as an input and providing a classification(s) as output, such as whether the speech is on target or off target with respect to a threshold.

In operation, speech encoder 301 receives audible speech as an input and generates audio data. Audio data may comprise a digital signal of the audible speech. Speech encoder 301 transmits the audio data to audio manager 303.

Audio manager 303 receives the audio data and slices the audio data into chunks of audio data. The length of the chunks may be based on an interval of time (e.g., milliseconds, seconds, minutes, etc.). For example, a one-minute speech may be sliced every second to generate sixty chunks of data, each having a length of one second. Though a length of one second is referenced above, any length of time may be used to generate the chunks of audio data.

Audio manager 303 may then slice the chunks into frames of audio data. For example, a chunk having a length of one second may be sliced into two frames having a length of one-half second. Frames may also be sliced such that adjacent frames comprise overlapping data. Using the previous example, a chunk having a length of one second may be sliced into 50 frames, each having a length of 40 milliseconds, where adjacent frames have overlapping data (e.g., 20 milliseconds of data is the same in adjacent frames). Audio manager 303 then transmits the overlapping frames to vector module 305. The lengths recited above are merely exemplary, and any interval of time is appropriate for slicing chunks into frames.

Vector module 305 receives the overlapping frames and extracts features of vocal patterns for each frame (e.g., using signal processing techniques). Extracted features may include, but are not limited to, pitch, power magnitude, style, expression, and the like. Vector module 305 generates feature vectors based on the extracted features and transmits the feature vectors to pattern model 307.

Pattern model 307 receives the feature vectors and applies ML techniques to characterize the frames individually. For example, pattern model 307 may ingest the feature vectors of a frame to estimate a pitch of the speech and a power spectrum of the speech for the frame. Pattern model 307 may then generate a magnitude ratio for the frame based on the pitch and the power spectrum.

Pattern model 307 may then determine a register classification for the frame based on a comparison of the magnitude ratio to a target value (e.g., threshold). The target value may be an absolute threshold that is not relative to the speaker. Alternatively, the target value may be a pitch-based threshold that is relative to the speaker. The target value may be a binary classifier (e.g., on target, off target, etc.), a range classifier (e.g., ≤target, ≥target, etc.), and the like. In implementations, the target value is used to determine a presence of vocal fry in a frame.

Figure 4:
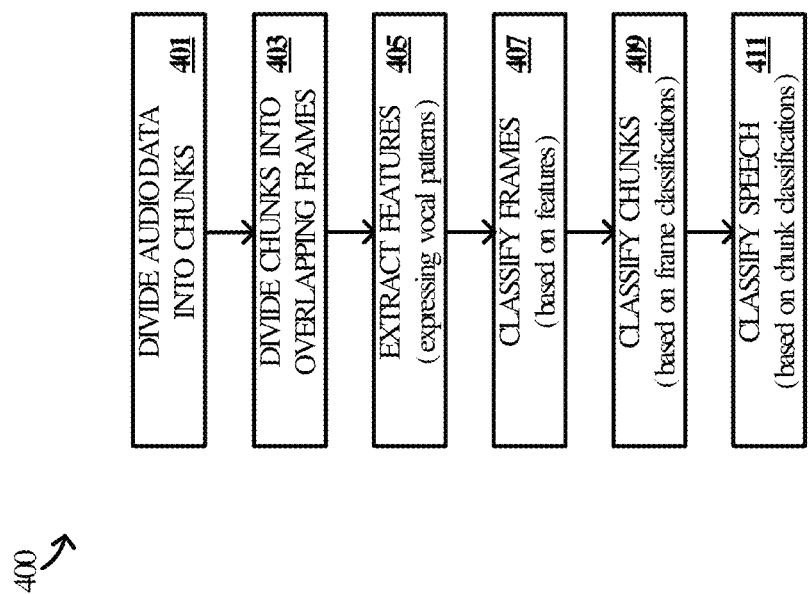
FIG. 4 illustrates a speech classification process in an implementation.

FIG. 4 illustrates another classification process 400, which may be employed by computing device 101 and/or online service 120, and in conjunction with some or all of the elements of operational architecture 300, to determine a register classification of audio input. Classification process 400 may be implemented in program instructions in the context of any of the software applications, modules, components, or other such elements of one or more computing devices (e.g., computing device 101). The program instructions direct the computing device(s) to operate as follows, referred to parenthetically to the steps of FIG. 4 and to a computing device in the singular for the sake of clarity.

In operation, an audio manager on a computing device receives audio data of a user's speech from a speech encoder and divides the audio data into chunks of audio data (step 401). The length of the chunks may be based on an interval of time (e.g., milliseconds, seconds, minutes, etc.). In one example, each chunk is approximately one half-second long. The computing device then divides the chunks into overlapping frames of audio data (step 403) of approximately 50 milliseconds that overlap with each other for approximately 40 milliseconds. For example, a chunk having a length of one half-second may be sliced into approximately 50 frames, each having a length of 50 milliseconds, but overlapping by 40 milliseconds with adjacent frames.

The audio manager provides the overlapping frames to a vector module on the computing device. The vector module extracts features of vocal patterns for each frame (step 405) and expresses the features in feature vectors. The feature vectors are quantitative representations of one or more features that can be supplied as input to a machine learning module. A pattern model on the computing devices receives the feature vector(s) for each individual frame and classifies each frame on an individually based on feature vector(s) supplied as input for each frame (step 407).

In the aggregate, the pattern model evaluates all of the frames, the results of which are passed to yet another module or other such element of the computing device to evaluate heuristically to determine a classification for the chunk (step 409). In one example, if greater than sixty percent of the overlapping frames in a chunk are classified as belonging to a given vocal register, then that chunk is classified as belonging to that vocal register.

Then, the classification for each chunk is considered in the aggregate with other chunks to determine a classification for the speech sample (step 411). In one example, if a threshold number of chunks in a row are classified as belonging to a given vocal register (e.g., 4 in a row), then the speech sample is classified as belonging to that vocal register.

Figure 5:
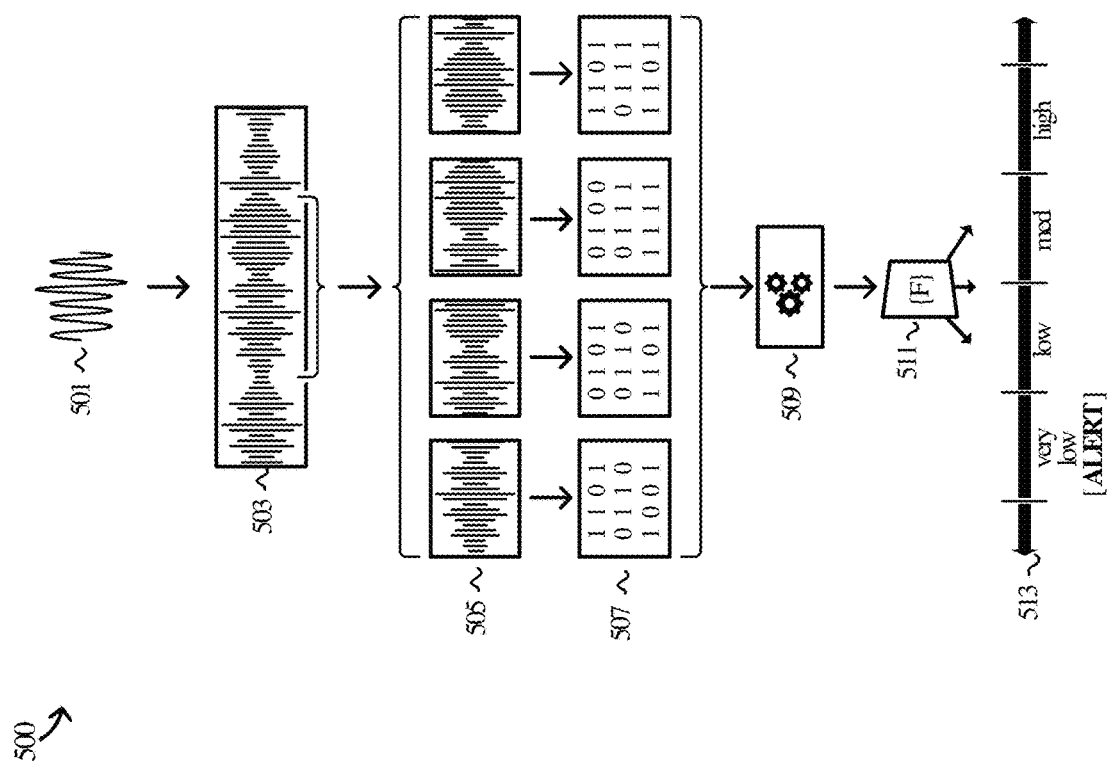
FIG. 5 illustrates an operational scenario in an implementation.

FIG. 5 illustrates operational scenario 500, which is representative of an application of classification process 400. Operational scenario 500 includes speech input 501, audio data 503, overlapping frames 505, feature vectors 507, pattern model 509, and mapping function 511. Speech 501 comprises audible speech which is supplied as input to a speech encoder (e.g., speech encoder 301). The speech encoder receives speech 501 and generates audio data 503. Audio data 503 may be generated by translating speech 501 into a digital signal. Audio data 503 is an input to an audio manager (e.g., audio manager 303).

The audio manager divides audio data 503 into overlapping frames 505. In the present example, the overlapping frames 505 are generated by the audio manager dividing audio data 503 into four frames. The four frames have lengths of signal data that overlap adjacent frames. Overlapping frames 505 are an input to a vector module (e.g., vector modules 305).

The vector model generates feature vectors 507. Feature vectors 507 are vector representations of the features of vocal patterns extracted from overlapping frames 505, and which are suitable input for pattern model 307. The feature vectors 507 may be understood as quantitative representations of the details of vocal patterns extracted from each overlapping frame. Pattern model 509 takes the feature vectors as input on a per-frame basis and outputs a classification of the frame as belonging to a specific vocal range.

The aggregate output from pattern model 509 is supplied as input to mapping function 511. Mapping function 511 maps to which portion of range 513 a given audio sample belongs based on an analysis of the classifications of the chunks in the sample, and thus the frames in the sample.

In a brief example, mapping function 511 receives classifications from pattern model 509 for an ongoing stream of audio frames of approximately 50 milliseconds each, which each next frame following 10 milliseconds after the previous frame such that the frames overlap by 40 milliseconds. Mapping function 511 considers the frames in half-second chunks. If more than 60% of the frames in a given chunk are classified as belonging to the very low portion of the range 513 associated with vocal fry, then that chunk is classified as belonging to that range. Then, if four consecutive chunks in a row are classified as belonging to the same very low portion of the range 513, then the audio stream overall is considered to be exhibiting vocal fry. That is, the user rehearsing or otherwise speaking with respect to a slide presentation is considered to be exhibiting vocal fry. Such a result triggers an alert or other such indication in the user interface to the application via which the user is rehearsing.

Figure 6:
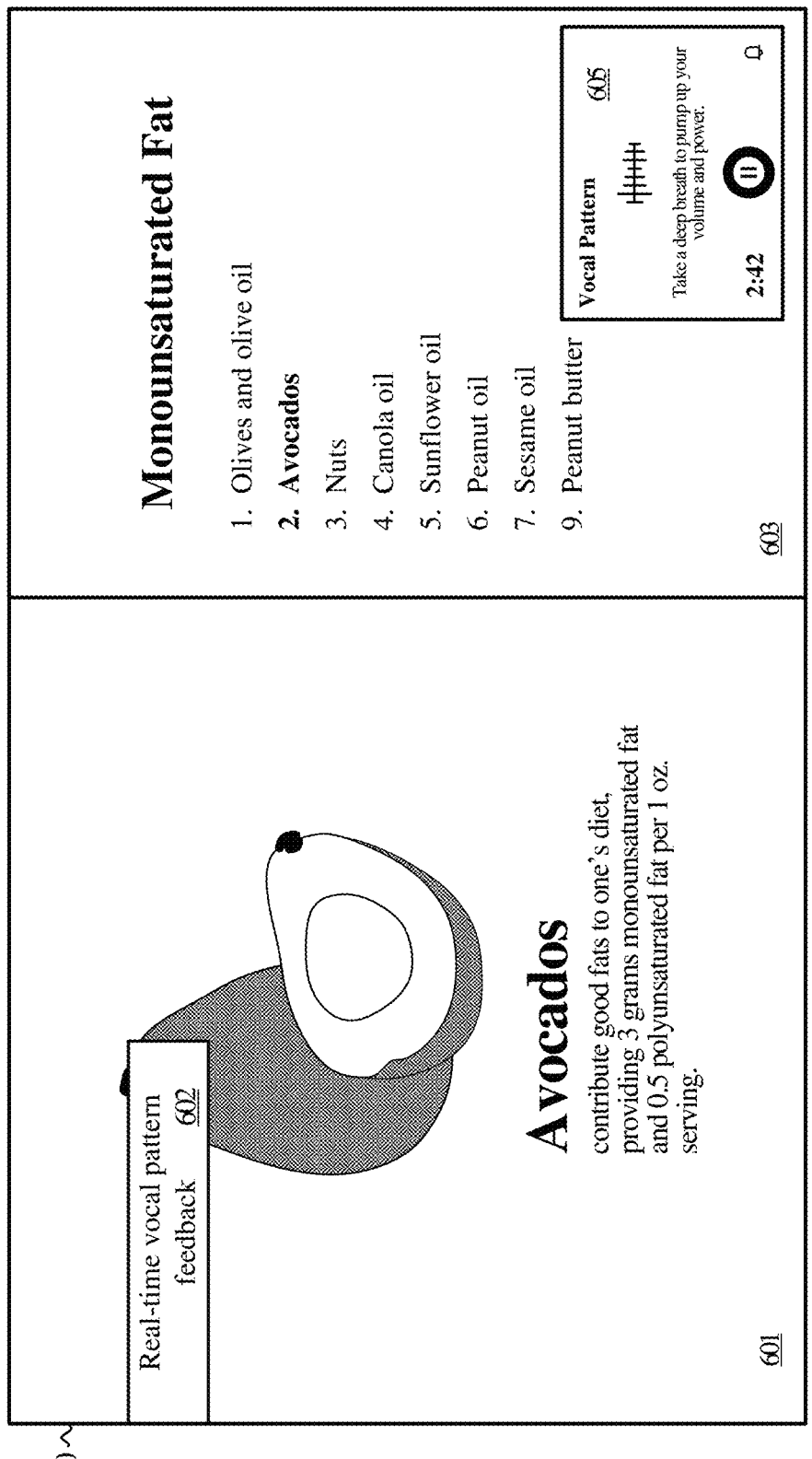
FIG. 6 illustrates a user interface in an implementation.

FIG. 6 illustrates user interface 600 that may be produced by a presentation application in an exemplary user experience. User interface 600 is representative of a slide in presentation mode and includes portions 601 and 603. Portion 601 displays indicator 602, a presentation graphic, and presentation text. Indicator 602 is a user interface component that indicates that feedback is available regarding the user's vocal pattern. Though the present example displays indicator 602 as overlaying the presentation graphic of portion 601, it is contemplated herein that indicator 602 may be rendered anywhere within user interface 600.

Portion 603 displays feedback 605 and presentation text. Feedback 605 is a user interface component that provides feedback corresponding to indicator 602. Specifically, feedback 605 comprises a playback feature (e.g., a button that enables audio data of the user's speech to be played back to the user, paused, stopped, etc.), a time stamp corresponding to the audio data being played back to the user, and a suggestion that may help the user improve their speech. Though the present example displays feedback 605 as overlaying the presentation graphic of portion 601, it is contemplated herein that feedback 605 may be rendered anywhere within user interface 600.

Figure 7:
FIG. 7 illustrates another user interface in an implementation.

FIG. 7 illustrates user interface 700 that may be produced by a presentation application in another exemplary user experience. User interface 700 includes rehearsal report 710, which comprises visual elements 701-706. Visual element 701 includes a summary of the presentation overall. Visual element 702 includes an indication of sensitive phrases that were used during the presentation. Visual element 703 includes an indication of originality with respect to the presentation. Visual element 704 includes an indication of the pace of the overall presentation. Visual element 705 includes an indication of fillers that were used during the presentation. Visual element 706 includes an indication of the pitch used during the presentation. User interface 700 may be surfaced in response to a selection of an alert (e.g., indicator 602, feedback alert 605, etc.).

Figure 8:
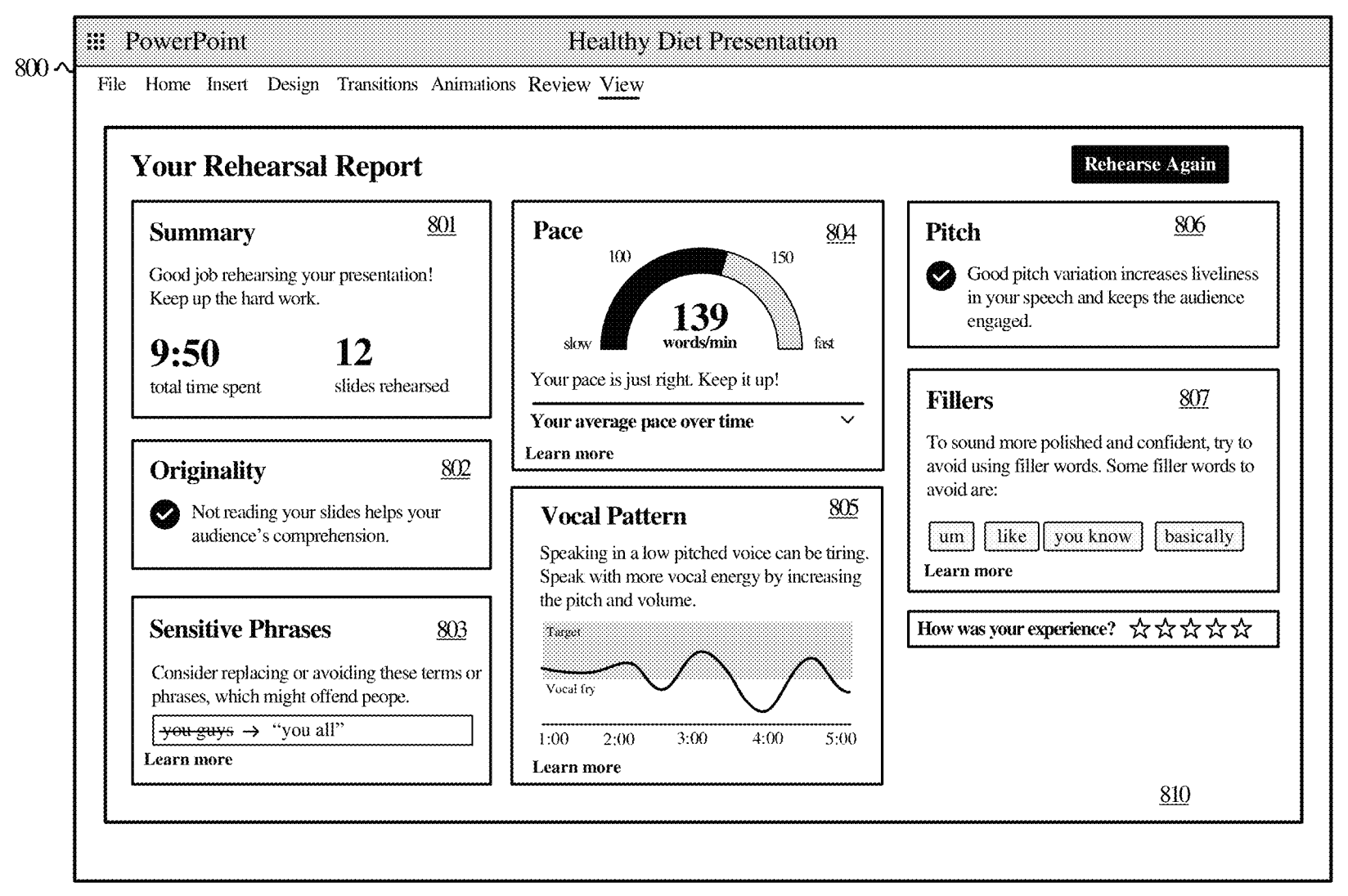

FIG. 8 illustrates user interface 800 that may be produced by an application in yet another exemplary user experience. User interface 800 includes rehearsal report 810, which comprises visual elements 801-807. Visual element 801 includes a summary of the presentation overall. Visual element 802 includes an indication of sensitive phrases that were used during the presentation. Visual element 803 includes an indication of originality with respect to the presentation. Visual element 804 includes an indication of the pace of the overall presentation. Visual element 805 includes an indication of the vocal pattern used during the presentation as well as the vocal fry. Visual element 806 includes an indication of the pitch used during the presentation. Visual element 807 includes an indication of fillers that were used during the presentation. User interface 800 may be surfaced in response to a selection of an alert (e.g., indicator 602, feedback alert 605, etc.).

FIG. 9 illustrates computing device 901 that is representative of any system or collection of systems in which the various processes, programs, services, and scenarios disclosed herein may be implemented. Examples of computing device 901 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes and implements process 906, which is representative of classification process 200 and classification process 400. When executed by processing system 902, software 905 directs processing system 902 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including process 906) may be implemented in program instructions and among other functions may, when executed by processing system 902, direct processing system 902 to operate as described with respect to the various operational scenarios, sequences, and processes illustrated herein. For example, software 905 may include program instructions for implementing the classification processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to computer generated feedback of speech analysis in an optimized manner. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

In one example implementation, process 906, when executed by processing system 902, directs computing system 901 to: generate an audio recording of user speech; extract features from the audio recording indicative of vocal patterns in the speech; determine a register classification of the speech based at least on the features; and display (or enable display of) an indication of the register classification in a user interface.

In the same example as above, computing system 901 divides the audio recording into chunks. In order to determine the register classification of the speech, computing system 901 determines a register classification of each of the chunks based at least on those of the features extracted from each chunk. In the same or other examples, computing system 901 divides each of the chunks into a sequence of overlapping frames, in which case, extracting the features from the audio recording includes extracting features from each of the sequence of overlapping frames.

In one or more of the examples immediately above, including any combination of the examples, determining the register classification of the speech based at least on the features may include classifying each frame, of the sequence of overlapping frames, as belonging to a specific range of a vocal register if a vocal pattern expressed by a feature extracted for the frame matches a vocal pattern of the specific range. In one or more of the same examples, (or any combination of the examples), determining the register classification of the speech includes classifying each chunk, of the chunks, as belonging to the specific range of the vocal register if a subset of the overlapping frames belonging to the chunk includes at least a threshold number of frames classified as belonging to the specific range.

In one or more of the examples immediately above, including any combination of the examples, determining the register classification of the speech may also include classifying the speech as belonging to the specific range of the vocal register if the audio recording includes a threshold number of consecutive ones of the chunks classified a belonging to the specific range. In one or more of the examples immediately above, including any combination of the examples, each of the chunks is a non-overlapping portion of the audio recording having a duration of about 0.5 seconds, and each of the overlapping frames has a duration of about 50 milliseconds that overlaps with a preceding frame for a duration of about 40 milliseconds. In some examples, the specific range of the vocal register is a range associated with vocal fry.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
one or more computer readable storage media;
one or more processors operatively coupled with the one or more computer readable storage media; and
program instructions stored on the one or more computer readable storage media that, when executed by the one or more processors, direct the computing apparatus to at least:
generate an audio recording of speech;
divide the audio recording into chunks, wherein each chunk comprises a sequence of frames;
extract, from frames of the sequences of frames, features indicative of vocal patterns in the speech;
classify each frame, of the frames, as belonging to a register classification of a plurality of register classifications based on the extracted features;
classify each chunk, of the chunks, as belonging to the register classification of the plurality of register classifications based on a threshold number of frames of the respective chunk classified as belonging to the register classification;
determine the register classification of the speech based at least on a threshold number of consecutive chunks classified as belonging to the register classification; and
display an indication of the register classification in a user interface.

2. The computing apparatus of claim 1 wherein the program instructions further direct the computing apparatus to determine a register classification of each of the chunks based at least on features extracted from each chunk.

3. The computing apparatus of claim 2 wherein the program instructions further direct the computing apparatus to divide each of the chunks into a sequence of overlapping frames, and wherein to extract the features from the frames of the sequences of frames, the program instructions further direct the computing apparatus to extract the features from each of the sequence of overlapping frames.

4. The computing apparatus of claim 3 wherein, to classify each frame of the frames as belonging to the register classification of the plurality of register classifications, the program instructions direct the computing apparatus to classify each frame, of the sequence of overlapping frames, as belonging to a specific range of a vocal register if a vocal pattern expressed by a feature extracted for the frame matches a vocal pattern of the specific range.

5. The computing apparatus of claim 4 wherein the program instructions further direct the computing apparatus to classify each chunk, of the chunks, as belonging to the specific range of the vocal register if a subset of the overlapping frames belonging to the chunk includes at least a threshold number of frames classified as belonging to the specific range.

6. The computing apparatus of claim 5 wherein the program instructions further direct the computing apparatus to classify the speech as belonging to the specific range of the vocal register if the audio recording includes a threshold number of consecutive ones of the chunks classified as belonging to the specific range.

7. The computing apparatus of claim 6 wherein each of the chunks comprises a non-overlapping portion of the audio recording having a duration of about 0.5 seconds, and wherein each of the overlapping frames has a duration of about 50 milliseconds that overlaps with a preceding frame for a duration of about 40 milliseconds.

8. The computing apparatus of claim 7 wherein the specific range of the vocal register comprises a range associated with vocal fry.

9. One or more computer readable storage media having program instructions stored thereon that, when executed by one or more processors, direct a computing device to at least:
generate an audio recording of speech;
divide the audio recording into chunks, wherein each chunk comprises a sequence of frames;
extract, from frames of the sequence of frames, features indicative of vocal patterns in the speech;
classify each frame of the frames as belonging to a register classification of a plurality of register classifications based on the extracted features;
classify each chunk, of the chunks, as belonging to the register classification of the plurality of register classifications based on a threshold number of frames of the respective chunk classified as belonging to the register classification;
determine the register classification of the speech based at least on a threshold number of consecutive chunks classified as belonging to the register classification; and
display an indication of the register classification in a user interface.

10. The one or more computer readable storage media apparatus of claim 9 wherein the program instructions further direct the computing device to determine a register classification of each of the chunks based at least on features extracted from each chunk.

11. The one or more computer readable storage media of claim 10 wherein the program instructions further direct the computing device to divide each of the chunks into a sequence of overlapping frames, and wherein to extract the features from the frames of the sequence of frames, the program instructions further direct the computing device to extract the features from each of the sequence of overlapping frames.

12. The one or more computer readable storage media of claim 11 wherein, to classify each frame of the frames as belonging to the register classification of the plurality of register classifications, the program instructions direct the computing device to classify each frame, of the sequence of overlapping frames, as belonging to a specific range of a vocal register if a vocal pattern expressed by a feature extracted for the frame matches a vocal pattern of the specific range.

13. The one or more computer readable storage media of claim 12 wherein the program instructions further direct the computing device to classify each chunk, of the chunks, as belonging to the specific range of the vocal register if a subset of the overlapping frames belonging to the chunk includes at least a threshold number of frames classified as belonging to the specific range.

14. The one or more computer readable storage media of claim 13 wherein the program instructions further direct the computing device to classify the speech as belonging to the specific range of the vocal register if the audio recording includes a threshold number of consecutive ones of the chunks classified as belonging to the specific range.

15. The one or more computer readable storage media of claim 14 wherein each of the chunks comprises a non-overlapping portion of the audio recording having a duration of about 0.5 seconds, and wherein each of the overlapping frames has a duration of about 50 milliseconds that overlaps with a preceding frame for a duration of about 40 milliseconds.

16. The one or more computer readable storage media of claim 15 wherein the specific range of the vocal register comprises a range associated with vocal fry.

17. A method of operating a computing device, the method comprising:
the computing device generating an audio recording of speech;
the computing device dividing the audio recording into chunks;
the computing device dividing each of the chunks into a sequence of overlapping frames;
the computing device extracting, from frames of the sequences of overlapping frames, features indicative of vocal patterns in the speech;
the computing device classifying the frames, of the sequences of overlapping frames, as belonging to a register classification of a plurality of register classifications based on the extracted features;
the computing device classifying each chunk, of the chunks, as belonging to the register classification of the plurality of register classifications based on a threshold number of frames of the respective chunk classified as belonging to the register classification;
the computing device determining the register classification of the speech based at least on a threshold number of consecutive chunks classified as belonging to the register classification; and
the computing device displaying an indication of the register classification in a user interface.

18. The method of claim 17 further comprising the computing device classifying the speech as belonging to a specific range of a vocal register if the audio recording includes a threshold number of consecutive ones of the chunks classified as belonging to the specific range.

19. The method of claim 18 further comprising the computing device classifying each chunk, of the chunks, as belonging to the specific range of the vocal register if a subset of the overlapping frames belonging to the chunk includes at least a threshold number of frames classified as belonging to the specific range.

20. The method of claim 19 further comprising the computing device classifying each frame, of the sequences of overlapping frames, as belonging to the specific range of the vocal register if a vocal pattern indicated by a feature extracted for the frame matches a vocal pattern of the specific range.

* * * * *